(12) United States Patent
Back et al.

(10) Patent No.: US 10,812,274 B2
(45) Date of Patent: Oct. 20, 2020

(54) TRANSFERRING LEDGER ASSETS BETWEEN BLOCKCHAINS VIA PEGGED SIDECHAINS

(71) Applicant: Blockstream Corporation, Montreal (CA)

(72) Inventors: Adam Back, Valletta (MT); Gregory Maxwell, Mountain View, CA (US); Matt Corallo, New York City, NY (US); Luke Dashjr, Tampa bay, FL (US); Mark Friedenbach, San Jose, CA (US); Andrew Poelstra, Austin, TX (US); Jorge Timon, San Francisco, CA (US); Pieter Wuille, Mountain View, CA (US)

(73) Assignee: Blockstream Corporation, Montreal (CA)

( * ) Notice: Subject to any disclaimer, the term of this patent is extended or adjusted under 35 U.S.C. 154(b) by 829 days.

(21) Appl. No.: 15/150,032

(22) Filed: May 9, 2016

(65) Prior Publication Data

US 2016/0330034 A1    Nov. 10, 2016

Related U.S. Application Data

(60) Provisional application No. 62/158,432, filed on May 7, 2015.

(51) Int. Cl.
*G06Q 20/00* (2012.01)
*H04L 9/32* (2006.01)
(Continued)

(52) U.S. Cl.
CPC ........... *H04L 9/3255* (2013.01); *G06Q 20/06* (2013.01); *G06Q 20/065* (2013.01);
(Continued)

(58) Field of Classification Search
USPC .......................................................... 705/64
See application file for complete search history.

(56) References Cited

U.S. PATENT DOCUMENTS

2016/0098723 A1\* 4/2016 Feeney .............. G06Q 20/4016
                                                                      705/75
2018/0359096 A1\* 12/2018 Ford ..................... H04L 9/3236

OTHER PUBLICATIONS

Andresen, G., BIP16: Pay to script hash, Bitcoin Improvement Proposal, 2012, https://github.com/bitcoin/bips/blob/master/bip-0016.mediawiki.

(Continued)

*Primary Examiner* — Jacob C. Coppola
*Assistant Examiner* — John M Winter
(74) *Attorney, Agent, or Firm* — Dergosits & Noah LLP; Todd A. Noah

(57) ABSTRACT

Systems and methods are described for transferring an asset from a parent chain to a sidechain. A simplified payment verification (SPV) proof associated with the parent chain asset may be generated. The SPV proof may include a threshold level of work. The SPV proof associated with the parent chain asset may be validated, and a sidechain asset corresponding to the parent chain asset may be generated. If no reorganization proof is detected, the sidechain asset is released. To redeem the sidechain asset in the parent chain, a SPV proof associated with the sidechain asset may be generated. The parent chain may validate the SPV proof associated with the sidechain asset. The parent chain asset associated with the sidechain asset may be held for a second predetermined contest period. The parent chain asset may then be released if no reorganization proof associated with the sidechain asset is detected.

13 Claims, 4 Drawing Sheets

(51) Int. Cl.
G06Q 20/40 (2012.01)
G06Q 20/06 (2012.01)
G06Q 40/00 (2012.01)

(52) U.S. Cl.
CPC ....... *G06Q 20/0655* (2013.01); *G06Q 20/401* (2013.01); *G06Q 40/12* (2013.12)

(56) References Cited

OTHER PUBLICATIONS

Andreson, G., BIP34: Block v2, height in coinbase, Bitcoin Improvement Proposal, 2012, https://github.com/bitcoin/bips/blob/master/bip-0034.mediawiki.
Aspnes et al., Exposing computationally-challenged Byzantine impostors, Tech. Report YALEU/DCS/TR-1332, Yale University, 2005, http://www.cs.yale.edu/homes/aspnes/papers/tr1332.pdf.
Back, A., Hashcash—a denial of service counter-measure, 2002, http://hashcash.org/papers/hashcash.pdf.
Back, A., bitcoins with homomorphic value (validatable but encrypted), 2013, BitcoinTalk post, https://bitcointalk.org/Index.php?topic=305791.0.
Back, A., [Bitcoin-development] is there a way to do bitcoin-staging?, 2013, Mailing list post, http://sourceforge.net/p/bitcoin/mailman/message/31519067/.
Bahack, L., Theoretical Bitcoin attacks with less than half of the computational power (draft), arXiv preprint arXiv:1312.7013 (2013).
Ben-Sasson et al., SNARKs for C: Verifying program executions succinctly and in zero knowledge, Cryptology ePrint Archive, Report 2013/507, 2013, http://eprint.iacr.org/2013/507.
Caldwell, M., Sustainable nanopayment idea: Probabilistic payments, 2012, BitcoinTalk post, https://bitcointalk.org/Index.php?topic=62558.0.
Chaum, D., Blind signatures for untraceable payments, Advances in Cryptology Proceedings of Crypto 82 (1983), No. 3, 199-203.
Friedenbach, M., [Bitcoin-development] compact SPV proofs via block header commitments, 2014, Mailing list post, http://sourceforge.net/p/bitcoin/mailman/message/32111357/.
Friedenbach et al., Freimarkets: extending bitcoin protocol with user-specified bearer instruments, peer-to-peer exchange, off-chain accounting, auctions, derivatives and transitive transactions, 2013, http://freico.in/docs/freimarkets-v0.0.1.pdf.
Gesell, The natural economic order, Peter Owen Ltd. 1958., London, 1916, https://archive.org/details/TheNaturalEconomicOrder.
Gerhardt et al., Homomorphic payment addresses and the pay-to-contract protocol, CoRR abs/1212.3257 (2012).
Grigg, I., Email correspondence, 1999, http://cryptome.org/jya/digicrash.htm.
I12012, OP_CHECKCOLORVERIFY: soft-fork for native color coin support, 2013, BitcoinTalk post, https://bitcointalk.org/index.php?topic=253385.0.
Lamport, L., Constructing digital signatures from a one-way function, Tech. Report SRI-CSL-98, SRI International Computer Science Laboratory, Oct. 1979.
Lietear, B., The future of money, Random House, London, Jan. 2001.
Maxwell, G., Deterministic wallets, 2011, BitcoinTalk post, https://bitcointalk.org/index.php?topic=19137.0.
Maxwell, G., User:gmaxwell/alt ideas, https://en.bitcoin.it/wiki/User:Gmaxwell/alt_ideas. Retrieved on Oct. 9, 2014., 2014.
Merkle, R.C., A digital signature based on a conventional encryption function, Lecture Notes in Computer Science, vol. 293, 1988, p. 369.
Miller, A., The high-value-hash highway, 2012, BitcoinTalk post, https://bitcointalk.org/index.php?topic=98986.0.
Miller et al., Anonymous Byzantine consensus from moderately-hard puzzles: A model for Bitcoin, Tech. Report CS-TR-14-01, UCF, Apr. 2014.
Mouton, Y.M., Increasing anonymity in Bitcoin . . . (possible alternative to Zerocoin?), 2013, BitcoinTalk post, https://bitcointalk.org/index.php?topic=290971.
Maxwell et al., Output distribution obfuscation, https://download.wpsoftware.net/bitcoin/wizardry/brs-arbitrary-output-sizes.txt, 2014.
Nakamoto, S., Bitcoin: A peer-to-peer electronic cash system, 2009, https://www.bitcoin.org/bitcoin.pdf.
Nolan, T., Re: Alt chains and atomic transfers, https://bitcointalk.org/index.php?topic=193281msg2224949#msg2224949, 2013.
Poelstra, A., ASICs and decentralization FAQ, 2014, https://download.wpsoftware.net/bitcoin/asic-faq.pdf.
Poelstra, A., Is there any _true_ anonymous cryptocurrencies?, Bitcoin.SE, 2014, http://bitcoin.stackexchange.com/a/29473.
Poelstra, A., A treatise on altcoins, 2014, Unfinished, https://download.wpsoftware.net/bitcoin/alts.pdf.
Pugh, W., Skip lists: A probabilistic alternative to balanced trees, Communications of the ACM 33 (1990), No. 6, 668, ftp://ftp.cs.umd.edu/pub/skipLists/skiplists.pdf.
Szabo, N., The idea of smart contracts, 1997, https://nakamotoinstitute.org/the-idea-of-smart-contracts/.
Todd, P., Fidelity-bonded banks: decentralized, auditable, private, off-chain payments, 2013, BitcoinTalk post, https://bitcointalk.org/index.php?topic=146307.0.
Van Saberhagen, N., Cryptonote v 2.0, https://cryptonote.org/whitepaper.pdf, 2013.
Wuille, P., BIP62: Dealing with malleability, Bitcoin Improvement Proposal, 2014, https://github.com/bitcoin/bips/blob/master/bip-0062.mediawiki.

* cited by examiner

TRANSFERRING LEDGER ASSETS BETWEEN BLOCKCHAINS VIA PEGGED SIDECHAINS

CROSS-REFERENCE TO RELATED APPLICATIONS

This application claims the benefit of U.S. Provisional Application No. 62/158,432, filed May 7, 2015, which is incorporated herein in its entirety.

COPYRIGHT NOTICE

A portion of the disclosure of this patent document including any priority documents contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to digital cryptocurrencies, and more specifically to transferring ledger assets between blockchains of different currencies using pegged sidechains.

SUMMARY OF THE INVENTION

Systems and methods are described for transferring an asset from a parent chain to a sidechain. A processor may send a parent chain asset to an output of the parent chain. A simplified payment verification (SPV) proof associated with the parent chain asset may be generated for the output. The SPV proof may include a threshold level of work, and the generating may take place over a predetermined period of time. A sidechain validator server may validate that the SPV proof associated with the parent chain asset meets the threshold level of work indicated by the SPV proof. A sidechain asset corresponding to the parent chain asset may be generated. The generated sidechain asset may be held for a predetermined contest period, during which the transfer is invalidated if a reorganization proof associated with the parent chain asset is detected in the parent chain. If no reorganization proof is detected, the sidechain asset may be released.

To redeem the sidechain asset in the parent chain, the sidechain asset may be sent to an output of the sidechain. A SPV proof associated with the sidechain asset may be generated. A parent chain validator server may validate the SPV proof associated with the sidechain asset. The parent chain asset associated with the sidechain asset may be held for a second predetermined contest period, during which a release of the parent chain asset is denied if a reorganization proof associated with the sidechain asset is detected in the sidechain. The parent chain asset may then be released if no reorganization proof associated with the sidechain asset is detected.

The systems and methods described herein simultaneously allow for easy creation and use of sidechain assets while avoiding fragmenting markets and development. In addition to the foregoing, in various embodiments asymmetric two-way pegging may be used to transfer an asset from a parent chain to a sidechain. The sidechain may include a sidechain validator server that monitors transactions taking place in the parent chain associated with a parent chain asset. A sidechain asset may be generated corresponding to the parent chain asset in response to a receiving, by the sidechain validator server, a request to transfer the parent chain asset to the sidechain. The sidechain asset may be held for a predetermined contest period, during which the transferring is invalidated if a reorganization proof associated with the parent chain asset is detected in the parent chain. If no reorganization proof is detected, then the sidechain asset may be released. A transfer of the sidechain asset back to the parent chain may be performed in substantially the same manner as the symmetric two-way pegging mechanism described above.

In addition to the foregoing, systems and methods for creating and verifying a compressed version of a SPV proof are described. A blockheader is generated for a block of a parent asset, where the blockheader includes a plurality of commitments. Each commitment may be associated with one of a plurality of past headers before the blockheader in a block history associated with the parent asset. The plurality of commitments of the generated blockheader may be stored in a Merkle tree. The generated blockheader may be verified by extracting the plurality of commitments, and checking a block greater than one link back in the plurality of past headers. Based on the checked block, a work amount indicated by the blockheader may be verified to exceed a total work target proven by following direct predecessor links of the blockheader, thereby verifying the authenticity of the compressed SPV proof.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
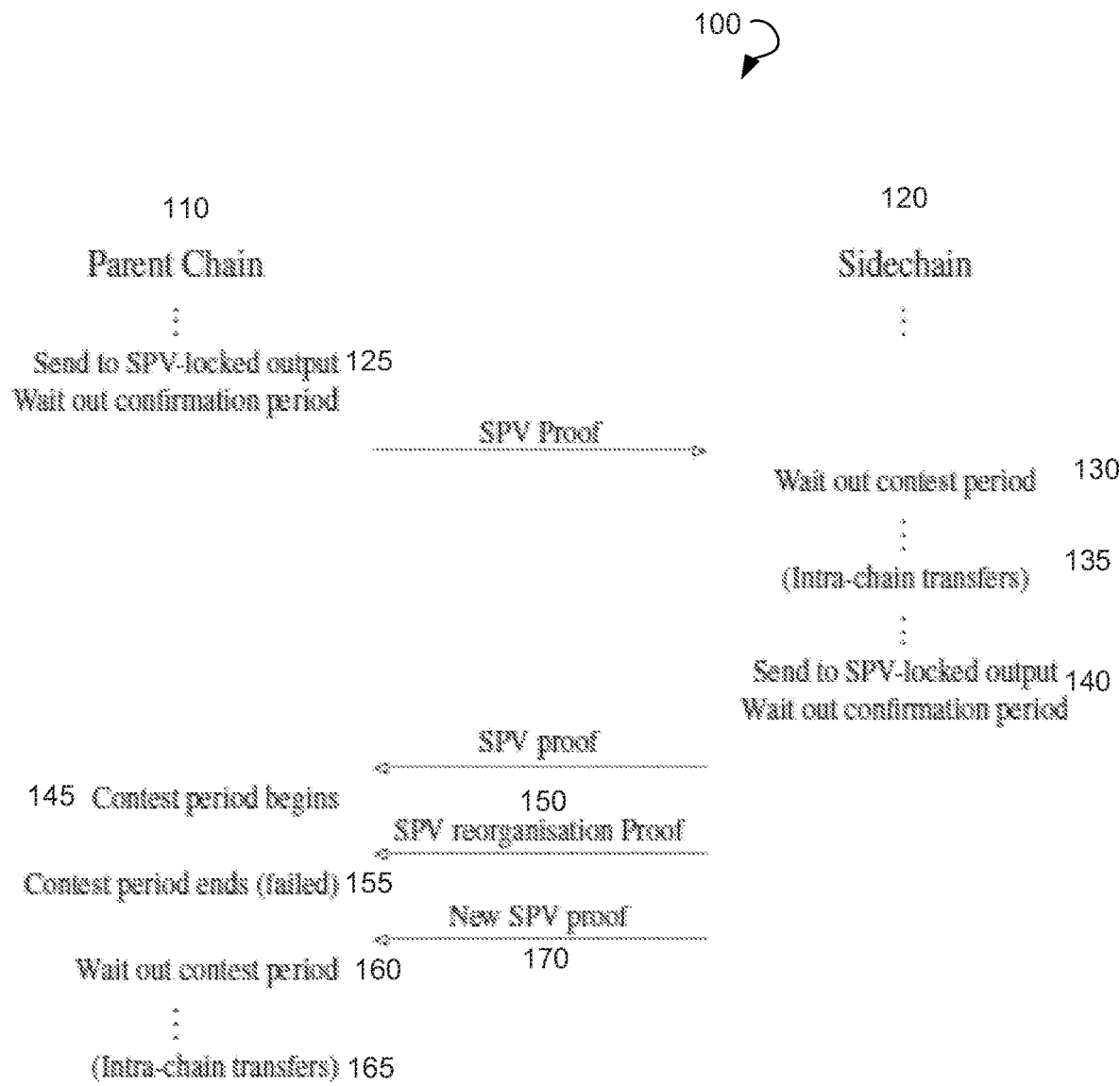
FIG. 1 shows a flow diagram for a symmetric two-way pegged transfer from a parent chain to a sidechain, under an embodiment.

Since the introduction of Bitcoin (see S. Nakamoto, *Bitcoin: A peer-to-peer electronic cash system,* 2009, https://www.bitcoin.org/bitcoin.pdf, incorporated herein by reference) in 2009, there has been great interest in the potential of decentralised cryptocurrencies. At the same time, implementation changes to the consensus-critical parts of Bitcoin are handled very conservatively. As a result, Bitcoin has had great difficulty in adapting to new demands and accommodating new innovation.

The systems and methods for pegged sidechains described herein allow bitcoins and other ledger assets to be transferred between multiple blockchains. This gives users access to new and innovative cryptocurrency systems using the assets they already own, without requiring the consensus that Bitcoin does to implement innovative new abilities (e.g., regarding security, transferability, etc.). By being linked to Bitcoin's currency via two-way pegs, the separate currency systems can more easily interoperate with each other and with Bitcoin, avoiding liquidity shortages and market fluctuations associated with new currencies. Since sidechains are separate currencysystems, technical and economic innovation is not hindered. Despite bidirectional transferability between Bitcoin and pegged sidechains, the blockchains of Bitcoin and the pegged sidechain are isolated. This means that, in the case of a cryptographic break (or malicious design) in a pegged sidechain, the damage would be entirely confined to the sidechain itself. This application describes out pegged sidechains, their implementation requirements, and the work needed to fully benefit from the future of interconnected blockchains.

A coin, or asset, is a digital property whose controller can be cryptographically ascertained. Bitcoin generally tracks asset transfers by aggregating them into blocks, which may be a collection of transactions describing changes in asset control. Each block may be linked to an associated blockheader, which cryptographically commits to: the contents of the block, a timestamp, and the previous blockheader. A cryptographical "commitment" is a cryptographic object which is computed from some secret data such that the data cannot be changed after the fact, where the object does not reveal the secret data. An example of a commitment is a hash: given data x, one can publish H(x) where H is a hash function, and only later reveals x (e.g., by using a hash table).

Verifiers can confirm that the revealed value is the same as the original value by computing H(x) themselves. The blockheader commitments to previous headers form a blockchain (or "chain), which provides a well-defined ordering for transactions. A blockchain is a well-ordered (i.e., each subset of the blockchain has a least element in the ordering) collection of blocks, on which all users must (eventually) come to consensus. This determines the history of asset control and provides a computationally unforgeable time ordering for transactions.

Bitcoin's blockheaders can be regarded as an example of a dynamic membership multi-party signature (or DMMS), a new type of group signature. A DMMS is a digital signature formed by a set of signers which has no fixed size. Bitcoin's blockheaders are DMMSes because their proof-of-work has the property that anyone can contribute with no enrollment process. Further, contribution is weighted by computational power rather than one threshold signature contribution per party, which allows anonymous membership without risk of a Sybil attack (when one party joins many times and has disproportionate input into the signature), because limitations in computational power.

Because the blocks are chained together, Bitcoin's DMMS is cumulative: any chain (or chain fragment) of blockheaders is also a DMMS on its first block, with computational strength equal to the sum of the strengths of the DMMSes it is composed of. Because signers prove computational work, rather than proving secret knowledge as is typical for digital signatures, they may be referred to herein as miners. To achieve stable consensus on the blockchain history, economic incentives are provided where miners are rewarded with fees and subsidies in the form of coins (e.g. bitcoins) that are valuable only if the miners form a shared valid history, incentivising the miners to behave honestly. Because the strength of Bitcoin's cumulative DMMS is directly proportional to the total computational power contributed by all miners (see A. Poelstra, *ASICs and decentralization FAQ*, 2014, https://download.wpsoftware.net/bitcoin/asic-faq.pdf, hereby incorporated by reference), it becomes infeasible for a computational minority to change the chain. If the computational minority tries to revise the DMMS-secured ledger, they will fall behind and be continually unable to catch up to the moving target of the progressing consensus blockchain.

Because the miners do not form an identifiable set, they cannot have discretion over the rules determining transaction validity. Therefore, new valid transaction forms cannot be added except with the agreement of every network participant. Even with such an agreement, changes are difficult to deploy because they require all participants to implement and execute the new rules in exactly the same way, including edge cases and unexpected interactions with other features. Over a large-scale system such as that of Bitcoin, making changes to the rules determining transaction validity may be difficult. Weaknesses in the implementation of Bitcoin have been identified, including:

Inability to customize trade-offs between scalability and decentralization: for example, a larger block size would allow the network to support a higher transaction rate, at the cost of placing more work on validators—a centralisation risk. Similarly, there are trade-offs between security and cost. Bitcoin stores every transaction in its history with the same level of irreversibility. This is expensive to maintain and may not be appropriate for low value or low-risk transactions (e.g. where all parties already have shared legal infrastructure in place to handle fraud). These trade-offs should be made for each transaction, as transactions vary widely in value and risk profile. However, Bitcoin by construction supports only a "one size fits all" solution.

Inability to customize blockchain features: for example, Bitcoin's script could be more powerful to enable succinct and useful contracts, or could be made less powerful to assist in auditability.

Inability to trade assets other than bitcoins on blockchains: IOUs and other contracts, as well as smart property (see, e.g., N. Szabo, *The idea of smart contracts*, 1997, http://szabo.best.vwh.net/idea.html, hereby incorporated by reference) could be traded on blockchains, but may not be done under the current Bitcoin infrastructure.

Risk of monoculture: Bitcoin is composed of many cryptographic components, any one of whose failures could cause a total loss of value. If possible, it would be desirable not to secure every bitcoin with the same set of algorithms.

Inability to implement new features not imagined when Bitcoin was first developed: For example, privacy and censorship-resistance could be improved by use of cryptographic accumulators (see Y. M. Mouton, *Increasing anonymity in Bitcoin . . . (possible alternative to Zerocoin?)*, 2013, BitcoinTalk post, https://bitcointalk.org/index.php?topic=290971., hereby incorporated by reference), ring signatures (see N. van Saberhagen, *Cryptonote v* 2.0, https://cryptonote.org/whitepaper.pdf, 2013, hereby incorporated by reference), or Chaumian blinding (see D. Chaum, *Blind signatures for untraceable payments*, Advances in Cryptology, Proceedings of Crypto 82 (1983), no. 3, 199-203, hereby incorporated by reference).

Lack of safe upgrade path for Bitcoin, in the sense that all participants must act in concert for any change to be effected: There is consensus amongst Bitcoin developers that changes to Bitcoin must be done slowly, cautiously, and only with clear assent from the community. The fact that functionality must be broadly acceptable to gain adoption limits participants' personal freedom and autonomy over their own coins. Small groups are unable to implement features, such as special-purpose script extensions (see jl2012, OP_CHECKCOLORVERIFY: soft fork for native color coin support, 2013, BitcoinTalk post, https://bitcointalk.org/index.php?topic=253385.0, hereby incorporated by reference), because they lack broad consensus.

An early solution to these problems with Bitcoin has been the development of alternate blockchains, or altchains, which share the Bitcoin codebase except for modifications to address the above concerns. However, implementing technical changes through the creation of independent but essentially similar systems is problematic. One problem is infrastructure fragmentation: because each altchain uses its own technology stack, effort is frequently duplicated and lost across different altchains. Because of this, and because implementers of altchains may fail to clear the very high barrier of security-specific domain knowledge in Bitcoin, security problems may be duplicated across altchains while their fixes are not. Substantial resources must be spent finding or building the expertise to review novel distributed cryptosystems, but when they are not, security weaknesses are often invisible until they are exploited. As a result, a volatile, un-navigable environment may develop, where the most visible projects may be the least technically sound. As an analogy, imagine an Internet where every website used its own TCP implementation, advertising its customized checksum and packetsplicing algorithms to end users. This would not be a viable environment, and neither is the conventional environment of altchains.

A second problem is that such altchains, like Bitcoin, typically have their own native cryptocurrency, or altcoin, with a floating price. To access the altchain, users must use a market to obtain this currency, exposing them to the high risk and volatility associated with new currencies. Further, the requirement to independently solve the problems of initial distribution and valuation, while at the same time contending with adverse network effects and a crowded market, discourages technical innovation while at the same time encouraging market games. This is dangerous not only to those directly participating in these systems, but also to the cryptocurrency industry as a whole. If the field is seen as too risky by the public, adoption may be hampered, or cryptocurrencies might be deserted entirely (voluntarily or legislatively).

It would be desirable to have interoperable altchains that may be easily created and used, but without unnecessarily fragmenting markets and development. An early solution was to "transfer" coins by destroying bitcoins in a publicly recognisable way, which would be detected by a new blockchain to allow creation of new coins. This is a partial solution to the problems listed above, but since it allows only unidirectional transfers between chains, without allowing for an asset to be returned to the parent chain, lacks flexibility.

The present invention describes such interoperable blockchains, which are referred to as "pegged sidechains." The pegged sidechains described herein may simultaneously achieve the seemingly contradictory goals of easy creation and use while avoiding fragmenting markets and development. The core observation is that "Bitcoin" the blockchain is conceptually independent from "bitcoin" the asset: by supporting the movement of assets between blockchains, new systems may be developed which users could adopt by simply reusing the existing bitcoin currency. While embodiments herein use bitcoin as an examplery parent blockchain, because its strong network effects make it likely that users will prefer it over other, newer assets. However, any altcoin can be adapted to be usable with pegged sidechains.

The pegged sidechains allow assets that are moved between sidechains to be moved back by whomever the assets' current holder is, and nobody else (including previous holders). A sidechain is a blockchain that validates data from other blockchains. A pegged sidechain is a sidechain whose assets can be imported from and returned to other chains. An exemplary mechanism for moving assets to and from a pegged sidechain is a two-way peg, which allows assets to be transferred to and from sidechains at a fixed or otherwise deterministic exchange rate.

Pegged sidechains also allow assets to be moved without counterparty risk; that is, dishonest parties are precluded from preventing the transfer to occur. Transfers using the pegged sidechains are atomic; the transfer either happens entirely, or not at all. Another benefit of using pegged sidechains is avoidance of failure modes that result in loss or permit fraudulent creation of assets. Pegged sidechains may, to provide further security, be firewalled, meaning a bug in one sidechain enabling creation (or theft) of assets in that sidechain does not result in creation or theft of assets on any other sidechain.

A reorganization, or reorg, occurs locally in clients when a previously accepted cryptocurrency blockchain is overtaken by a competitor blockchain with more proof of work, causing any blocks on the losing side of the fork to be removed from consensus history. Blockchain reorganisations within a pegged side chain may be handled cleanly, even during transfers. That is, any disruption may be localized to the sidechain on which it occurs, and would not affect the parent chain. In general, sidechains may be fully independent, with users providing any necessary data from other chains. Validators of a sidechain may only be required to track another chain if the tracking is an explicit consensus rule of the sidechain itself. Finally, users of a sidechain may not be required to track sidechains that they are not actively using.

Assets are transferred to the pegged sidechains by providing proofs of possession in the transferring transactions themselves, avoiding the need for nodes to track the sending chain. On a high level, when moving assets from one blockchain to another, a transaction is created on the first blockchain locking the assets. A transaction is also created on the second blockchain whose inputs include a cryptographic proof that the lock transaction on the first blockchain was done correctly. These inputs are tagged with an asset type, e.g. the genesis hash of the asset's originating blockchain.

A simplified payment verification proof (or SPV proof) is an example of a proof of possession used to transfer assets to a pegged sidechain. A SPV proof may be a DMMS showing that an action occurred on a Bitcoin-like proof-of-work blockchain. "Proof-of-work" refers to how the rules of a chain, which may be part of a blockchain's definition, define how work in that chain is measured. To verify a SPV proof for a particular chain, a verifier must know and understand the chain's rules about how work is generated. Nodes in the network may continually perform work to create blocks in a chain. In an embodiment, a SPV proof may include (a) a list of blockheaders demonstrating proof-of-work, and (b) a cryptographic proof that an output was created in one of the blocks in the list. Such SPV proofs may allow verifiers to check that some amount of work has been committed to the existence of an output. Such a proof may be invalidated by another proof demonstrating the existence of a chain with more work which does not include the block which created the output, thereby exposing fraudulent transfers.

Using SPV proofs to determine history, implicitly trusting that the longest blockchain is also the longest correct blockchain, may be done by SPV clients in Bitcoin. That is, if a rule-violating ("dishonest") participant produces an invalid block or a fork in the past history of the chain, the honest participants will ignore it and continue to mine the entirely valid chain with the most work. If the dishonest party has less than 50% of the total work producing capacity ("hashpower") of the network as a whole, then the invalid block fork will fall hopelessly behind, resulting in a shorter blockchain than the valid chain. Accordingly, only a dishonest collusion with greater than 50% of the hashpower can persistently fool an SPV client (unless the client is under a long-term Sybil attack, preventing it from seeing the actual longest chain), since the honest hashpower will not contribute work to an invalid chain. This improves performance, as a verifier that cannot check all of the rules, can make an assumption that the chain with the most work is valid (at least beyond the most recent tip, which could be invalid because the honest participants have not eclipsed any invalidity there yet).

In conventional Bitcoin implementations, only the set of unspent transaction outputs (UTXO's) is needed to determine the status of all coins. In an exemplary embodiment, by requiring each blockheader to commit to the blockchain's unspent output set, anyone in possession of an SPV proof can determine the state of the chain without needing to "replay" every block. (In conventional Bitcoin implementations, full verifiers need to do this when they first start tracking the blockchain.) By constructing a Merkle tree (R. C. Merkle, *A digital signature based on a conventional encryption function*, Lecture Notes in Computer Science, vol. 293, 1988, p. 369, hereby incorporated by reference), every element of the UTXO set may be committed using only a single hash, minimizing the blockheader space used. As discussed below, by including some additional data in Bitcoin's block structure, smaller proofs than a full list of headers may be produced, which may improve scalability. Also, in some embodiments, the SPV proofs may not be necessary for most transactions; holders of coins on each sidechain may exchange them directly using atomic swaps (T. Nolan, *Re: Alt chains and atomic transfers*, https://bitcointalk.org/index.php?topic=193281.msg2224949#msg2224949, 2013, hereby incorporated by reference), as described below.

The first blockchain may be referred to as the parent chain, and the second blockchain may be referred to as the sidechain. In some embodiments, both chains are treated symmetrically, so this terminology should be considered relative. Conceptually, an asset is transferred from the (original) parent chain to a sidechain, then again possibly onward to another sidechain, and eventually back to the parent chain, preserving the original asset. In an exemplary embodiment, the parent chain may be Bitcoin and the sidechain as one of many other blockchains. Of course, sidechain coins could be transferred between sidechains, not just to and from Bitcoin; however, since any coin originally moved from Bitcoin could be moved back, it would nonetheless remain a bitcoin.

Preservation of the asset within the parent chain advantageously solves the problem of fragmentation described in the previous section, which is beneficial for cryptocurrency developers who want to focus solely on technical innovation. Furthermore, because sidechains transfer existing assets from the parent chain rather than creating new ones, sidechains cannot cause unauthorized creation of coins, relying instead on the parent chain to maintain the security and scarcity of its assets. Of course, sidechains are able to support their own assets, which the sidechains are responsible for maintaining the scarcity thereof. However, sidechains can only affect the scarcity of themselves and their child chains, not of the parent chain.

Further still, using pegged sidechains, participants do not need to be as concerned that their holdings are locked in a single experimental altchain, since sidechain coins can be redeemed for an equal number of parent chain coins. This provides an exit strategy, reducing harm from unmaintained software and/or sidechains. On the other hand, because sidechains are still blockchains independent of Bitcoin, they are free to experiment with new transaction designs, trust models, economic models, asset issuance semantics, or cryptographic features.

An additional benefit to this infrastructure is that making changes to a parent blockchain (e.g., Bitcoin) itself becomes much less pressing. Rather than orchestrating a fork which all parties need to agree on and implement in tandem, a new "changed Bitcoin" could be created as a sidechain. If, in the medium term, there were wide agreement that the new system was an improvement, it may end up seeing significantly more use than Bitcoin. As there are no changes to parent chain consensus rules, everyone can switch in their own time without any of the risks associated with consensus failure. Then, in the longer term, the success of the changes in the sidechain would provide the needed confidence to change the parent chain, if and when it is deemed necessary to do so.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

FIG. 1 shows a flow diagram 100 for a symmetric two-way pegged transfer from a parent chain 110 to a sidechain 120, under an embodiment. In flow 100, a processor may send a parent chain asset to an output of the parent chain at step 125. A simplified payment verification (SPV) proof associated with the parent chain asset may be generated for the output. The SPV proof may include a threshold level of work, and the generating may take place over a predetermined period of time, which may also be referred to as a confirmation period. The confirmation period of a transfer between chains is a duration for which a coin is locked on the parent chain before it can be transferred to the sidechain. This confirmation period may allow for sufficient work to be created such that a denial of service attack in the next waiting period becomes more difficult. A exemplary typical confirmation period maybe on the order of a 1-2 days. The confirmation period may be implemented, in an exemplary embodiment, as a per-sidechain security parameter, which trades cross-chain transfer speed for greater security.

The output created on the parent chain may be "special," in that that the rules to spend an asset received by the output in the future are set with additional conditions, in addition to the rules governing transfer within the parent chain. That is, release of assets received by the output are set to depend on rules for verifying a proof from the destination chain, where the rules for the destination chain proof show that the destination chain has released the asset and where the asset has been released. After creating the special output on the parent chain, the user waits out the confirmation period, then creates a transaction on the sidechain referencing this output. The sidechain, using a sidechain validator server, is providing with an SPV proof that shows the parent chain asset was created and buried under sufficient work on the parent chain. A sidechain validator server may validate that the SPV proof associated with the parent chain asset meets the threshold level of work indicated by the SPV proof at step 130. A sidechain asset corresponding to the parent chain asset may be generated.

Returning to FIG. 1, the generated sidechain asset also may be held for a predetermined contest period at step 130, during which the transfer is invalidated if a reorganization proof associated with the parent chain asset is detected in the parent chain (see below). The contest period is a duration in which a newly-transferred coin may not be spent on the sidechain. The predetermined contest period may advantageously prevent double-spending in the parent chain by transferring previously-locked coins during a reorganization. If at any point during this delay, a new proof (known as a "reorganization proof") is published containing a chain with more aggregate work which does not include the block in which the lock output was created, the conversion is retroactively invalidated. If no reorganization proof is detected, the sidechain asset may be released. All users of the sidechain have an incentive to produce reorganization proofs if possible, as the consequence of a bad proof being admitted is a dilution in the value of all sidechain coins.

An exemplary typical contest period may also be on the order of a 1-2 days. To avoid these delays, users will likely use atomic swaps (described below) for most transfers, as long as a liquid market is available. Once the sidechain asset is released, the side chain asset corresponding to the parent chain asset may be transferred within the sidechain one or more times, as indicated at step 135. While locked on the parent chain, the coin can be freely transferred within the sidechain without further interaction with the parent chain. However, a sidechain asset retains its identity as a parent chain coin, and may, in some embodiments, only be transferred back to the same chain from which the sidechain asset originated.

To redeem the sidechain asset in the parent chain, the sidechain asset may be sent to an output of the sidechain at step 140. A SPV proof associated with the sidechain asset may be generated. A parent chain validator server may validate the SPV proof associated with the sidechain asset at step 145. The validating the SPV proof associated with the sidechain asset may include, for example, validating, by the parent validator server, that the SPV proof associated with the sidechain asset meets the threshold level of work indicated by the SPV proof associated with the sidechain asset.

The parent chain asset associated with the sidechain asset also may be held for a second predetermined contest period at step 145, during which a release of the parent chain asset is denied at step 155 if a reorganization proof 150 associated with the sidechain asset is detected in the sidechain. The parent chain asset may be released if no reorganization proof 150 associated with the sidechain asset is detected.

In the event of a failure of validation of the second SPV proof, after the reorganization proof 150 is received a second SPV proof 170 associated with the sidechain asset may be received and validated by the parent chain 110 during a third predetermined contest period at step 160. The parent chain asset may be released if no reorganization proof associated with the sidechain asset is detected during the third predetermined contest period, after which the parent chain asset is free to be transferred within the parent chain at step 165.

Since pegged sidechains may carry assets from many chains, and cannot make assumptions about the security of these chains, it is important, for certain embodiments, that different assets are not interchangeable (except by an explicit trade) within the sidechain. Otherwise a malicious user may execute a theft by creating a worthless chain with a worthless asset, move such an asset to a sidechain, and exchange it for something else. To combat this, sidechains mayeffectively treat assets from separate parent chains as separate asset types.

In a symmetric two-way pegged sidechain transfer, as described in method 100, the parent chain and sidechains do SPV validation of data on each other. Since the parent chain clients do not observe every sidechain, users import proofs of work from the sidechain into the parent chain in order to prove possession. In a symmetric two-way peg, the converse is also true.

To use Bitcoin as the parent chain, an extension to script which can recognize and validate such SPV proofs may be used. To facilitate such transactions, the SPV proofs would preferably be compact enough to fit in a Bitcoin transaction. However, such a change may advantageously be implemented as a soft-forking change, without effect on transactions not involved in pegged sidechain transactions. That is, using symmetric two-way pegged sidechains as described above, no further restrictions would be made on what is valid within Bitcoin.

There are several additional advantages to using the pegged sidechains described herein. On the level of assets, a simple "one chain, one asset" maxim is no longer applicable. Individual chains may be flexible enough to support many assets, even ones that did not exist when the chain was first created. Each of these assets may be labeled with the chain it was transferred from to ensure that their transfers can be unwound correctly.

Reorganizations of arbitrary depth are in principle possible, which could allow an attacker to completely transfer coins between sidechains before causing a reorganization longer than the contest period on the sending chain to undo its half of the transfer. The result would be an imbalance between the number of coins on the recipient chain and the amount of locked output value backing them on the sending chain. If the attacker is allowed to return the transferred coins to the original chain, he would increase the number of coins in his possession at the expense of other users of the sidechain. This risk can be made arbitrarily small by, for example, increasing the contest period for transfers. The duration of the contest period could be made a function of the relative hashpower of the parent chain and the sidechain: the recipient chain might only unlock coins given an SPV proof of one day's worth of its own proof-of-work, which might correspond to several days of the sending chain's proof-of-work. Security parameters like these are properties of the particular sidechain and can be optimised for each sidechain's application.

Alternatively, in some embodiments an SPV proof may be created witnessing such a reorganization, and sidechains may accept such proofs. The sidechains may be designed to react in one of many possible ways. For example, the sidechain may have no reaction, resulting in the sidechain being a "fractional reserve" of the assets it is storing from other chains. This may be acceptable for tiny amounts which are believed to be less than the number of lost sidechain coins, or if an insurer promises to make good on missing assets.

Another sidechain response to a reorganization may be that the peg and all dependent transactions could be reversed. A third sidechain response may be to reduce the amount of all coins, while leaving the exchange rate intact. Reducing the exchange rate for sidechain coins would be equivalent. Many variations on these reactions are also possible: for example, temporarily decreasing the exchange rate so those who "make a run" on the sidechain cover the loss of those who don't.

In Bitcoin, a soft-fork is an addition to the Bitcoin protocol made backwards compatible by being designed to strictly reduce the set of valid transactions or blocks. A soft-fork can be implemented with merely a supermajority of the mining computational power participating, rather than all full nodes. However, participants' security with respect to the soft-forked features is only SPV-level until they upgrade.

A two-way peg, implemented in the embodiment described above, may only have SPV security and may therefore have greater short-term dependence on miner honesty than Bitcoin. However, a two-way peg can be boosted to security absolutely equal to Bitcoin's if all full nodes on both systems inspect each other's chain and demand mutual validity as a soft-forking rule.

A negative consequence of this would be loss of isolation of any soft-fork-required sidechain. Since isolation was one of the goals of using pegged sidechains, this may be undesirable unless a sidechain was almost universally used. Absent pegged sidechains, however, the next alternative would be to deploy individual changes as hard- or soft-forks in Bitcoin directly. This is even more abrupt, and provides no real mechanism for the new facility to prove its maturity and demand before risking Bitcoin's consensus on it.

There are many improvements to cryptocurrencies that may be provided by using the pegged sidechains described above. By using a sidechain which carries bitcoins rather than a completely new currency, one can avoid the thorny problems of initial distribution and market vulnerability, as well as barriers to adoption for new users, who no longer need to locate a trustworthy marketplace or invest in mining hardware to obtain sidechain assets.

Because sidechains are technically still fully-independent chains, they are able to change features of Bitcoin such as block structure or transaction chaining. For example, by fixing undesired transaction malleability, protocols which involve chains of unconfirmed transactions can be executed safely. Transaction malleability is a problem in Bitcoin which allows arbitrary users to tweak transaction data in a way that breaks any later transactions which depend on them, even though the actual content of the transaction is unchanged.

Also, improved payer privacy (e.g. the ring signature scheme used by Monero) can reduce the systemic risk of the transactions of particular parties being censored, protecting the fungibility of the cryptocurrency. Improvements to this have been suggested by Maxwell and Poelstra (G. Maxwell and A. Poelstra, *Output distribution obfuscation*, https://download.wpsoftware.net/bitcoin/wizardry/brs-arbitrary-output-sizes.txt, 2014 and A. Poelstra, *Is there any_true_anonymous cryptocurrencies?*, Bitcoin.SE, 2014, http://bitcoin.stackexchange.com/a/29473, hereby incorporated by reference) and Back (A. Back, *bitcoins with homomorphic value (validatable but encrypted)*, 2013, BitcoinTalk post, https://bitcointalk.org/index.php?topic=305791.0., hereby incorporated by reference) which would allow for even greater privacy. Today, ring signatures can be used with Monero coins, but not bitcoins; sidechains may avoid this exclusivity.

Script extensions (for example, to efficiently support colored coins, see jl2012, *OP_CHECKCOLORVERIFY: soft fork for native color coin support*, 2013, BitcoinTalk post, https://bitcointalk.org/index.php?topic=253385.0, hereby incorporated by reference) have been proposed for Bitcoin. Since such extensions are usable only by a small subset of users, but all users would need to deal with the increased complexity and risk of subtle interactions, these extensions have not been accepted into Bitcoin, but could be implemented in pegged sidechains. Other suggested script extensions could include support for new cryptographic primitives. For example, Lamport signatures (L. Lamport, *Constructing digital signatures from a one-way function*, Tech. Report SRI-CSL-98, SRI International Computer Science Laboratory, October 1979, hereby incorporated by reference), while large, may secure against quantum computers.

Since changes like those described above affect only the transfer of coins, rather than their creation, there is no need for them to require a separate currency. With sidechains, users can safely and temporarily experiment with such changes. This encourages adoption for the sidechain, and is less risky for participants relative to using an entirely separate altcoin, as conventionally done.

Other experimentation may be performed in sidechains with economic incentives. For example, Bitcoin's reward structure assigns new coins to miners. This effectively inflates the currency but it winds down over time according to a step-wise schedule. In a demurring cryptocurrency, by contrast, all unspent outputs lose value over time, with the lost value being recollected by miners. This keeps the currency supply stable while still rewarding miners. It may be better aligned with user interests than inflation because loss to demurrage is enacted uniformly everywhere and instantaneously, unlike inflation; it also mitigates the possibility of long-unspent "lost" coins being reanimated at their current valuation and shocking the economy, which is a perceived risk in Bitcoin. Demurrage creates incentives to increase monetary velocity and lower interest rates, which are considered to be socially beneficial. In pegged sidechains, demurrage allows miners to be paid in existing already valued currency. Other economic changes include required miner fees, transaction reversibility, outputs which are simply deleted once they reach a certain age, or inflation/demurrage rates pegged to events outside of the sidechain. All of these changes are difficult to do safely in Bitcoin, but the ease of creation and reduced risk of sidechains provide the necessary environment for them to be viable.

It is possible for sidechains to produce their own tokens, or issued assets, which carry their own semantics. These can be transferred to other sidechains and traded for other assets and currencies, all without trusting a central party, even if a trusted party is needed for future redemption. Issued asset chains may have many applications, including traditional financial instruments such as shares, bonds, vouchers, and IOUs. This allows external protocols to delegate ownership and transfer tracking to the sidechain on which the ownership shares were issued. Issued asset chains may also support more innovative instruments such as smart property.

These technologies can also be used in complementary currencies. Examples of complementary currencies include community currencies, which are designed to preferentially boost local businesses; business barter associations, which support social programs like education or elderly care; and limited-purpose tokens which are used within organizations such as massive multiplayer games, loyalty programs, and online communities.

A suitably extended scripting system and an asset-aware transaction format would allow the creation of useful transactions from well-audited components, such as the merger of a bid and an ask to form an exchange transaction, enabling the creation of completely trustless peer-to-peer marketplaces for asset exchange and more complex contracts such as trustless options (see M. Friedenbach and J. Timón, *Freimarkets: extending bitcoin protocol with user-specified bearer instruments, peer-to-peer exchange, off-chain accounting, auctions, derivatives and transitive transactions,* 2013, http://freico.in/docs/freimarkets-v0.0.1.pdf, hereby incorporated by reference). These contracts could, for example, help reduce the volatility of bitcoin itself.

Figure 2:
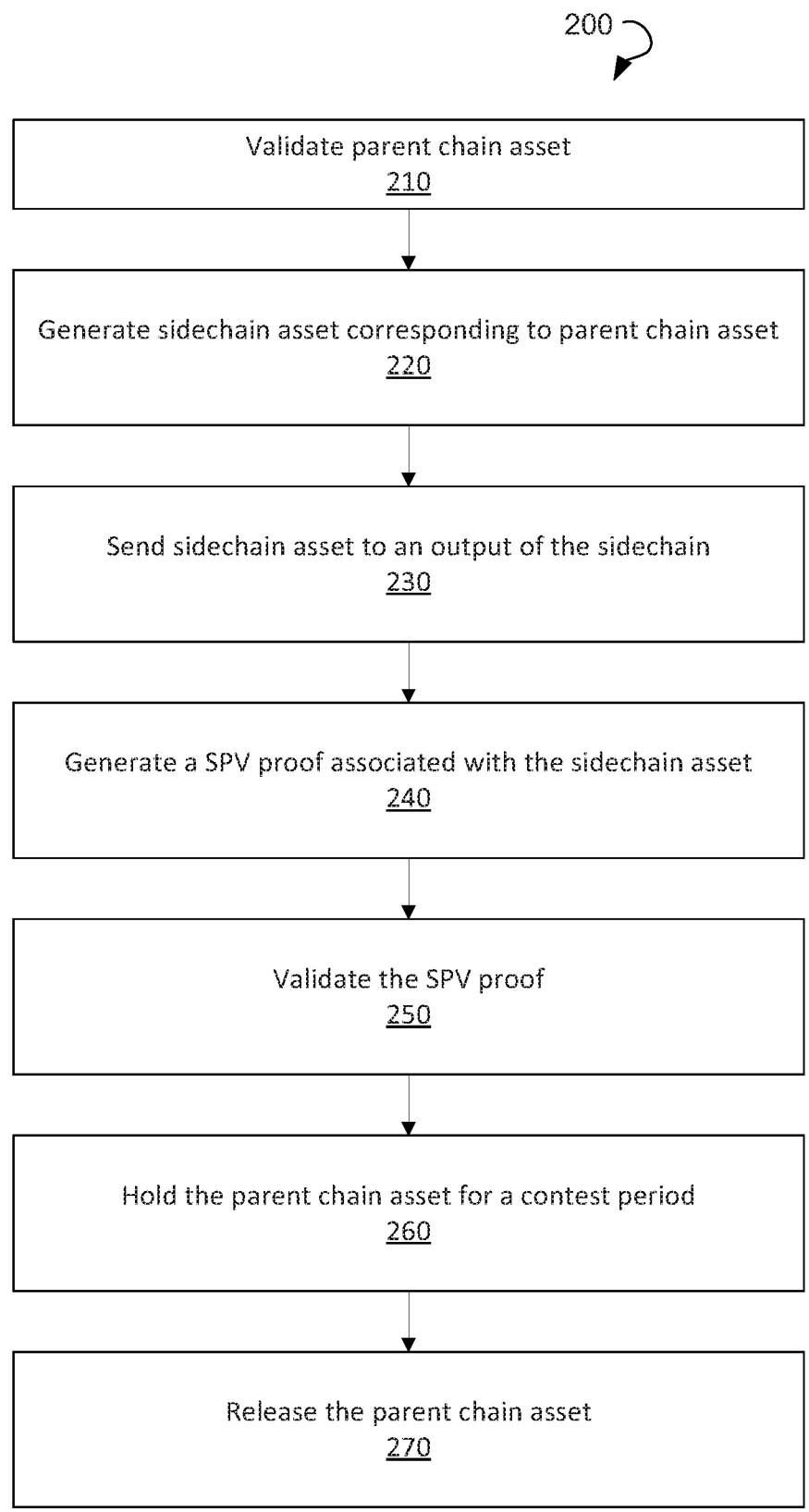
FIG. 2 shows a flow diagram for an asymmetric two-way pegged transfer from a parent chain to a sidechain, under an embodiment.

An alternate scheme to the method of FIG. 1 is an asymmetric two-way peg: here users of the sidechain are full validators of the parent chain, and transfers from parent chain to sidechain do not require SPV proofs, since all validators are aware of the state of the parent chain. FIG. 2 shows a method 200 for an asymmetric two-way pegged transfer from a parent chain to a sidechain, under an embodiment.

At step 210, a sidechain validator server, may validate a parent chain asset in response to receiving, by the sidechain validator server, a request to transfer the parent chain asset to the sidechain. The validating may include determining if a proof of work associated with the parent chain asset is valid, as is described above with respect to Bitcoin. A sidechain asset corresponding to the parent chain asset is generated in response to determining that the proof of work is valid at step 220. The sidechain asset is then allowed to be transferred normally within the sidechain system. Having the sidechain validator server be a validator of the parent chain gives a boost in security compared to the symmetric two-way peg, since now even a 51% attacker cannot falsely move coins from the parent chain to the sidechain.

Returning the sidechain asset to the parent chain is accomplished using SPV proofs, as described above, in an exemplary embodiment. At step 230, the sidechain asset is sent to an output of the sidechain in response to a request to transfer the sidechain asset back to the parent chain. A SPV proof associated with the sidechain asset is generated at step 240. A transaction is created on the parent chain referencing the output of the sidechain, and the parent chain, via a parent chain validator server, is provided with the generated SPV proof. The parent chain may then validate the SPV proof associated with the sidechain at step 250. The parent chain asset may then be held for a predetermined contest period, during which a release of the parent chain asset is denied if a reorganization proof associated with the sidechain asset is detected in the sidechain at step 260. The contest period may function as described above. At step 270, the parent chain asset is released if no reorganization proof associated with the sidechain asset is detected.

The discussion above centers on two-way pegged transfers using SPV proofs, which are forgeable by a 51%-majority of hashpower (as described above) and blockable by however much hashpower is needed to build a sufficiently-long proof during the transfer's contest period in the exemplary embodiment. There is a tradeoff on this latter point—if 33% hashpower of the parent chain can block a proof, then 67% is needed to successfully use a false one, and so on. However, modifications may be made with the transfer mechanism in accordance with various embodiments of the present invention to increase attack resistance. For example, assurance contracts may be required, such that the sidechain's transaction fees are withheld from miners unless their hashpower is at least, say, 66% of that of Bitcoin. These sorts of contracts are easy for a cryptocurrency to implement, if they are designed in from the start, and serve to increase the cost of blocking transfers. Time-shifted fees, where miners receive part of their fees in a block far in the future (or spread across many blocks) so that they have incentive to keep the chain operational may also be implemented. This may incentivise miners to simply receive fees out-of-band, avoiding the need to wait for future in-chain rewards. A variation on this scheme is for miners to receive a token enabling them to mine a low-difficulty block far in the future; this has the same effect, but directly incentivizes the recipient of the sidechain asset to mine the chain. Demurrage, as previously discussed, or subsidy, where the sidechain issues its own separate native currency as a reward for mining, may also be implemented in some embodiments. Moreover, SNARKs (see E. Ben-Sasson, A. Chiesa, D. Genkin, E. Tromer, and M. Virza, *SNARKs for C: Verifying program executions succinctly and in zero knowledge,* Cryptology ePrint Archive, Report 2013/507, 2013, hereby incorporated by reference) are space-efficient, quickly verifiable zero-knowledge cryptographic proofs that some computation was done. A futuristic idea for a low-value or experimental sidechain is to invoke a trusted authority, whose only job is to execute a trusted setup for a SNARK scheme. Then blocks could be constructed which prove their changes to the unspent-output set, but do so in zero-knowledge in the actual transactions. They could even commit to the full verification of all previous blocks, allowing new users to get up to speed by verifying only the single latest block. These proofs could also replace the DMMSes used to move coins from another chain by proving that the sending chain is valid according to some rules previously defined.

Another way to improve hashpower attack resistance is to use co-signed SPV proofs. Signers may be required to sign off on valid SPV proofs, watching for false proofs. This results in a direct tradeoff between centralization and security against a high-hashpower attack. There is a wide spectrum of trade-offs available in this area: signers may be required only for high-value transfers; they may be required only when sidechain hashpower is too small a percentage of Bitcoin's; etc.

One of the challenges in deploying pegged sidechains is that Bitcoin script is currently not expressive enough to encode the verification rules for an SPV proof. The required expressiveness could be added in a safe, compatible, and highly compartmentalized way (e.g., by converting a no-op instruction into an OP_SIDECHAINPROOFVERIFY in a soft-fork). However, the difficulty of building consensus for and deploying even simple new features is non-trivial.

Fortunately, by adopting some additional security assumptions at the expense of the low trust design objective, it is possible to do an initial deployment in a completely permissionless way. Instead of utilizing SPVs, pegged sidechains can be implemented externally by having a trusted federation of mutually distrusting functionaries evaluate the script and accept the script by signing for an ordinary multisignature script. That is, the functionaries act as a protocol adaptor by evaluating the same rules we would have wanted Bitcoin to evaluate, but cannot for lack of script enhancements. Using this we can achieve a "federated peg."

This approach is very similar to the approach of creating a multi-signature off-chain transaction system, but the required server-to-server consensus process is provided by simply observing the blockchains in question. The result is a deterministic, highly-auditable process which simplifies the selection and supervision of functionaries. Because of these similarities, many of the techniques used to improve security and confidence in off-chain payment systems can be employed for federated pegs. For example: functionaries can be geographically diverse, bonded via escrowed coins or expensive-to-create coercion-resistant pseudonymous identities, implemented on remote-attesting tamper-resistant hardware, and so on. For small-scale uses, owners of coins in the system can themselves act as the functionaries, thus avoiding third party trust.

Once sidechains with a federated peg are in use, the addition of SPV verification to Bitcoin script can be seen as merely a security upgrade to reduce the trust required in the system. Existing sidechains could simply migrate their coins to the new verification system. This approach also opens additional security options: the DMMS provided by mining is not very secure for small systems, while the trust of the federation is riskier for large systems. A sidechain could adaptively use both of these approaches in parallel, or even switch based on apparent hashrate.

Consider the example of a sidechain using a 3 of 5 federation of functionaries to implement a two-way peg with Bitcoin. The federation may have secp256k1 public points (public keys) P1, P2, P3, P4, and P5 and a redeemscript template 3 x x x x x 5 OP_CHECKMULTISIG known to all participants in the sidechain. To send coins to a ScriptPubKey SPK, a user who wants the coins to become available on a sidechain using the federated peg computes a cross-chain P2SH address by the following key derivation scheme:

---
Algorithm 1 GenerateCrossChainAddress
---

Input: A target ScriptPubKey SPK which will receive the coins in the other chain
Input A list $\{P_i\}_{i=1}^n$ of the functionaries* public points
Input: A redeemScript template describing the functionary requirements
Output: A P2SH address
Output: Nonce used for this instance
1: nonce ← random_128bit( )
2: for i ← [1,n] do
3:     Tweak$_i$ ← HMAC-SHA256(key = P$_i$, data = nonce||SPK)
4:     if Tweak$_i$ >= secp256k1_order then
5:         Go back to start.
6:     end if
7:     PCC$_i$ = P$_i$ + G × Tweak$_i$
8: end for
9: address ← P2SH_Multisig(template,keys = PCC))

---

Algorithm 1 illustrates an exemplary derivation scheme. After generating the address, coins can be paid to the address. A user may connect over a network to a node participating in the parent chain, and can request the SPV proof. The user may then later receive the resulting coins on the sidechain by providing the functionaries with the nonce, ScriptPubKey, and an SPV proof to help them locate the payment in the blockchain. In order to aid third-party verification of the sidechain, the nonce, the ScriptPubKey, and the SPV proof could be included in the sidechain itself. Because the transfer is made by paying to a standard P2SH address and can pay to any ScriptPubKey, all Bitcoin services which can pay to a multisignature address may immediately be able to pay into, or receive payments from, a user using a federated sidechain.

The federated peg approach necessarily compromises on trust, but requires no changes to Bitcoin—only the participants need to agree to use it and only the participants take the costs or risks of using it. Further, if someone wanted to prevent other people from using a sidechain they could not do so: if the federated peg is used privately in a closed community, its use can be made undetectable and uncensorable. This approach allows rapid deployment and experimentation and may allow the community to gain confidence in pegged sidechains before adopting any changes to the Bitcoin protocol.

Once a sidechain is operational, it is possible for users to exchange coins atomically between chains, without using the peg. This is important, because as we have seen, direct use of the peg requires fairly large transactions (with correspondingly large fees) and long wait periods. To contrast, atomic swaps can be done using only two transactions on each network, each of size similar to ordinary pay-to-address transactions.

Suppose we have two parties, A and B, who hold coins on different blockchains. Suppose also that they each have addresses pkA and pkB on the other's chain, and that A has a secret number a. Then A can exchange coins for B's as follows:

1. On one chain, A creates a transaction moving coins to an output O1 which can only be redeemed with (a) a revealing of a and B's signature, or (b) both A and B's signatures. A does not yet broadcast this. A creates a second transaction returning the coins from O1 to A, with a locktime of 48 hours (the locktime prevents the transaction from being included in the blockchain until a predetermined timeout has expired). A passes this transaction to B to be signed. Once B signs the locked refund transaction, A may safely broadcast the transaction moving coins to O1, and does so.
2. Similarly, B creates a transaction moving coins to an output O2 on the other chain, which can only be redeemed by (a) a revealing of a and A's signature, or (b) both A and B's signatures. B does not yet broadcast this. B creates a second transaction returning the coins from O2 to B, with a locktime of 24 hours. B passes this transaction to A to be signed. Once A signs the locked refund transaction, B may safely broadcast the transaction moving his coins to O2, and does so.
3. Since A knows a, A is able to spend the coins in O2, and does so, taking possession of B's coins. As soon as A does so, a is revealed and B becomes able to spend the coins in O1, and does so, taking possession of A's coins.

In order to transfer coins from a sidechain back to Bitcoin, embedded proofs (e.g., the SPVs described above) showing that sidechain coins were locked in the Bitcoin blockchain are utilized. These proofs may contain (a) a record that an output was created in the sidechain, and (b) a DMMS proving sufficient work on top of this output. Because Bitcoin's blockchain is shared and validated by all of its participants, it is preferable that these proofs not impose undue burden on the network. Outputs can be easily recorded compactly, but DMMS, including a significant block history, are not as easily compressed.

The confidence in an SPV proof can be justified by modelling an attacker and the honest network as random processes. These random processes have a useful statistical property: while each hash must be less than its target value to be valid, half the time it will be less than half the target;

a third of the time it will be less than a third the target; a quarter of the time less than a quarter the target; and so on. While the hash value itself does not change the amount of work a block is counted as, the presence of lower-than-necessary hashes is in fact statistical evidence of more work done in the chain. We can exploit this fact to prove equal amounts of work with only a few block headers. It should therefore be possible to greatly compress a list of headers while still proving the same amount of work. We refer to such a compressed list as a compact SPV proof or compressed DMMS.

However, while the expected work required to produce a fraudulent compact SPV proof is the same as that for a non-compact one, a forger's probability of success no longer decays exponentially with the amount of work proven: a weak opportunistic attacker has a much higher probability of succeeding "by chance"; i.e., by finding low hashes early. To illustrate this, suppose such an attacker has 10% of the network's hashrate, and is trying to create an SPV proof of 1000 blocks before the network has produced this many. Following the formula in Nakamoto 2009 (see above for full citation), the likelihood of success is approximately $10^{-196}$. By contrast, an attacker in the same time can produce a single block proving 1000 blocks' worth of work with probability of roughly 10%, significantly higher.

Figure 3:
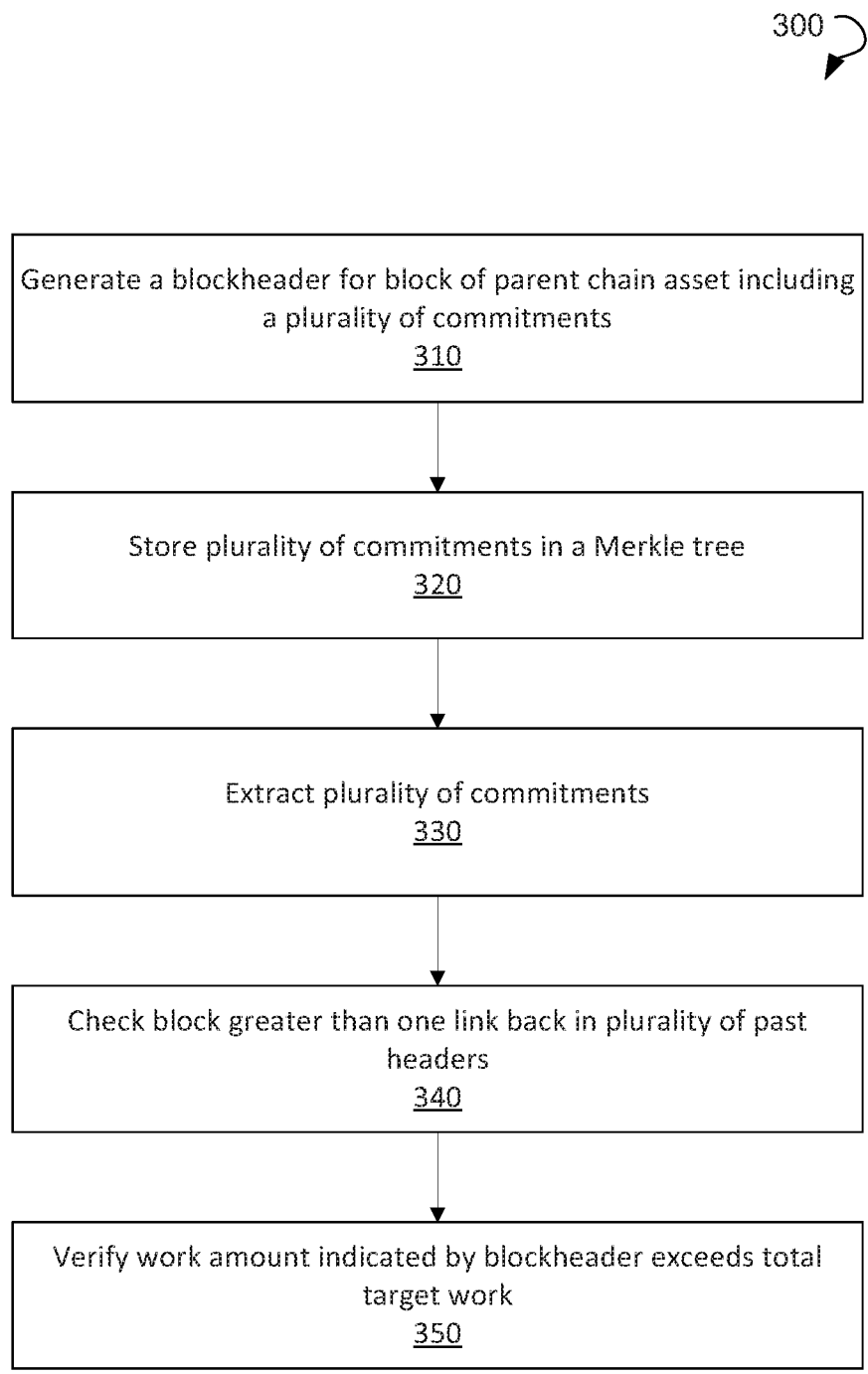
FIG. 3 shows a flow diagram of an exemplary method for creating and verifying a compressed version of a simplified payment verification (SPV) proof in accordance with various embodiments of the present invention.

FIG. 3 shows a flow diagram of an exemplary method 300 for creating and verifying a compressed version of a simplified payment verification (SPV) proof in accordance with various embodiments of the present invention.

To implement a compressed SPV proof, Bitcoin is modified in an exemplary embodiment so that rather than each asset blockheader committing only to the header before it, the asset blockheader commits to every one of its ancestors in the blockchain. This may be seen at step 310 of method 300, where a blockheader is generated for a block of a parent chain asset, where the blockheader includes a plurality of commitments. Each commitment may be associated with one of a plurality of past headers before the blockheader in a block history (i.e. a blockchain) associated with the parent asset. The plurality of commitments of the generated blockheader may be stored in a Merkle tree at step 320 for space efficiency. By including only a root hash in each block, we obtain a commitment to every element in the tree, since hash commitments are transitive. For example, given a hash function H( ) that takes input data and returns a commitment, a tree can be generated based on the commitments. The tree may be generated using the form: H(H(data1)∥H(data2)) =commitment, which outputs a commitment to both data1 and data2. The top level commitment may be designated as the root hash (as it is the base of the tree), allowing a small piece of data (e.g., 32 bytes, 64 bytes, etc) to commit to an arbitrarily large number of items each of arbitrary size.

When extracting SPV proofs, provers are allowed to use the plurality of commitments in an asset's blockheader to jump back to a block more than one link back in the chain, provided the work actually proven by the header exceeds the total target work proven by only following direct predecessor links. The result is a short DMMS which proves just as much work as the original blockchain. This is reflected in method 300, where, to verify the validity of the blockheader, the plurality of commitments may be extracted (e.g. from the Merkle tree) at step 330. A block greater than one link back in the plurality of past headers may be checked at step 340. Based on the checked block, a verifying server may verify that a work amount indicated by the blockheader exceeds a total target work proven by following direct predecessor links of the blockheader at step 350.

The compact SPV proof generated by method 300 can have a significant size reduction compared to uncompressed SPV proofs. For example, suppose we are trying to produce an SPV proof of an entire blockchain of height N. Assume for simplicity that difficulty is constant for the chain; i.e., every block target is the same. Consider the probability of finding a large enough proof to skip all the way back to the genesis within x blocks; that is, between block N–x and block N. This is one minus the probability we don't, or $$1 - \prod_{i=1}^{x} \frac{N-i}{N-i+1} = 1 - \frac{N-x}{N} = \frac{x}{N}. \quad (1)$$

The expected number of blocks needed to scan back before skipping the remainder of the chain is thus:

$$\sum_{x=1}^{N} \frac{x}{N} = \frac{N+1}{2}. \quad (2)$$

Therefore if we want to skip the entire remaining chain in one jump, we expect to search only halfway; by the same argument we expect to skip this half after only a quarter, this quarter after only an eighth, and so on. The result is that the expected total proof length is logarithmic in the original length of the chain. For a million-block chain, the expected proof size for the entire chain is only $\log_2 1000000 \approx 20$ headers. This brings the DMMS size down into the tens-of-kilobytes range, a significant size reduction.

However, as observed above, if an attacker is able to produce compact proofs in which only the revealed headers are actually mined, he is able to do so with non-negligible probability in the total work being proven. One such strategy is for the attacker to produce invalid blocks in which every backlink points to the most recent block. Then when extracting a compact proof, the attacker simply follows the highest-weighted link every time.

This problem may be addressed in several ways. By limiting the maximum skip size, we return to Bitcoin's property that the likelihood of a probabilistic attack decays exponentially with the amount of work being proven. The expected proof size is smaller than a full list of headers by a constant (proportional to the maximum skip size) factor. Alternatively, a maximum skip size may be used that increases with the amount of work being proven. Such a dynamic maximum skip size may make it possible to get sublinear proof sizes, at the cost of subexponential decay in the probability of attack success. This may give greater space savings while still forcing a probabilistic attacker's likelihood of success low enough to be considered negligible. In another embodiment, interactive approaches or a cut-and-choose mechanism may allow compact proofs with only a small security reduction. For example, provers might be required to reveal random committed blockheaders (and their connection to the chain), using some part of the proof as a random seed (e.g., by Fiat-Shamir transform). The root commitment would be used as a seed to initialize a cryptographic deterministic random number generator, such as, for example, NIST HMAC_DRBG (See U.S. Dept of Commerce, NIST SP 800-90A, January 2012, hereby incorporated by reference). Random values may be drawn from the generator and may be used to select parts of the SPV proof which must be revealed. Any change to the data in the proof (e.g. to insert a valid entries where they would otherwise be caught by the sampling) would change the seed, and then largely change which parts are sampled, causing a forged proof to be invalidated. This reduces the probability of attack while only increasing proof size by a constant factor.

If many transfers per sidechain are expected, a special output may be maintained in the parent chain to monitor the sidechain's tip. That is, instead of showing all the work for a chain associated with an asset, a SPV proof may show only the work generated since a known point. The parent chain may separately store a counter that remembers the known point and how much work was at that point since the start of the chain. Transfers would reference the known point and move it forward, which may result in smaller proofs. This parent chain output is moved by separate SPV proofs (which may be compacted in one of the above ways), with the result that the parent chain is aware of a recent sidechain's tip at all times. The transfer proofs would, in the embodiment, be required to always end at this tip, which can be verified with only a single output lookup. This may ensure verifiers that there are no "missing links" in the transfer proofs, so they may be logarithmic in size without increased risk of forgery. This makes the total cost to the parent chain proportional to the number of sidechains and their length; without this output, the total cost is also proportional to the number of inter-chain transfers. While several solutions have been discussed, the invention is not limited to these solutions, as any suitable solution optimizing the tradeoffs described above and formalizing the security guarantees may be used.

Figure 4:
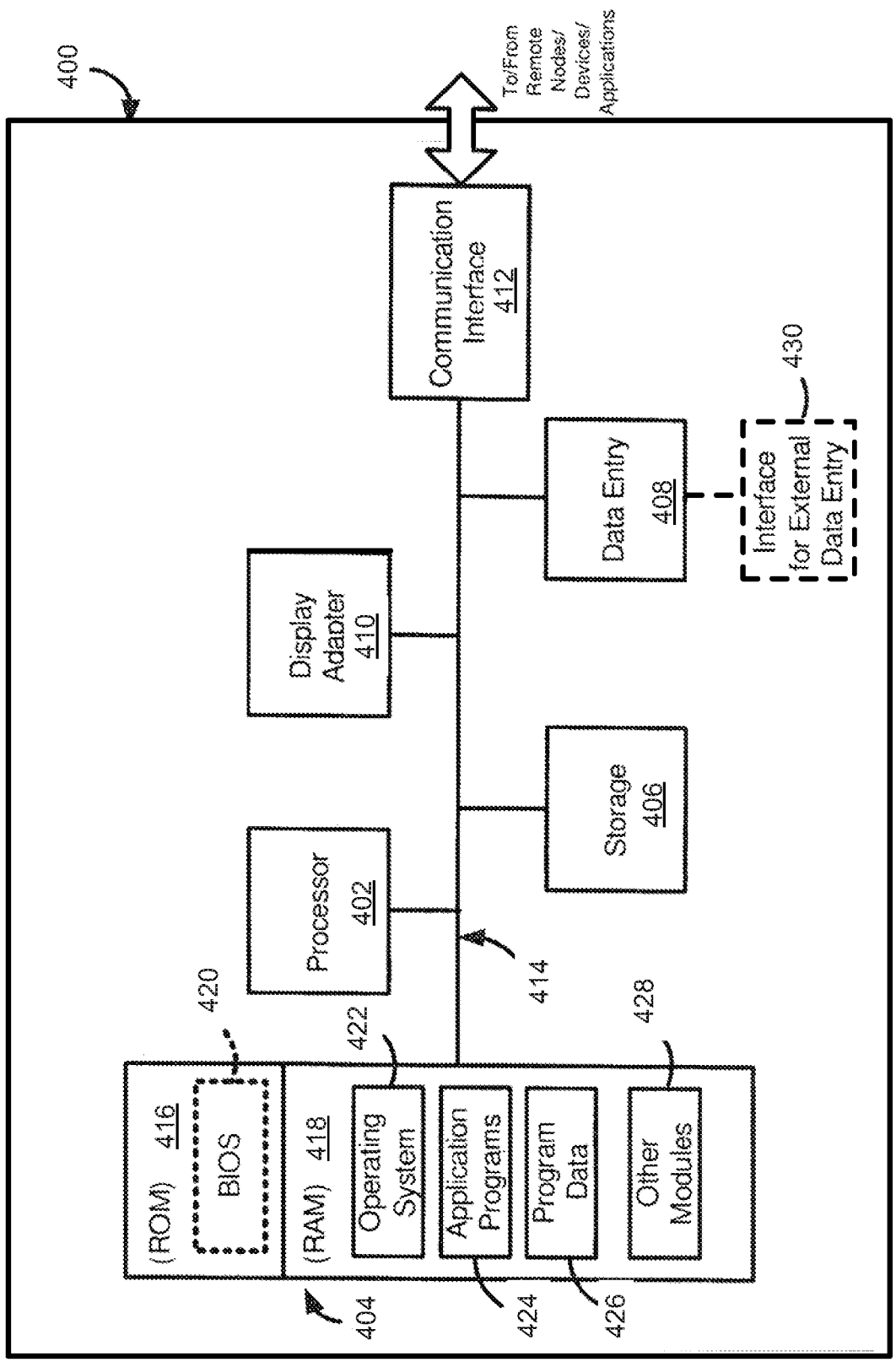
FIG. 4 is a block diagram of an exemplary system used in a transfer between a parent chain and a pegged sidechain in accordance with various embodiments of the present invention.

FIG. 4 is a block diagram of an exemplary system for providing a pegged sidechain in accordance with various embodiments of the present invention. With reference to FIG. 4, an exemplary system for implementing the subject matter disclosed herein, including the methods described above, includes a hardware device 400, including a processing unit 402, memory 404, storage 406, data entry module 408, display adapter 410, communication interface 412, and a bus 414 that couples elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in memory 404 and/or storage 406 and/or received via data entry module 408.

The memory 404 may include read only memory (ROM) 416 and random access memory (RAM) 418. Memory 404 may be configured to store program instructions and data during operation of device 400. In various embodiments, memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAM-BUS DRAM (RDRAM), for example. Memory 404 may also include nonvolatile memory technologies such as nonvolatile flash RAM (NVRAM) or ROM. In some embodiments, it is contemplated that memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, ROM 416 or RAM 418, including an operating system 422, one or more applications programs 424, program data 426, and other program modules 428. A user may enter commands and information into the hardware device 400 through data entry module 408. Data entry module 408 may include mechanisms such as a keyboard, a touch screen, a pointing device, etc. Other external input devices (not shown) are connected to the hardware device 400 via external data entry interface 430. By way of example and not limitation, external input devices may include a microphone, joystick, game pad, satellite dish, scanner, or the like. In some embodiments, external input devices may include video or audio input devices such as a video camera, a still camera, etc. Data entry module 408 may be configured to receive input from one or more users of device 400 and to deliver such input to processing unit 402 and/or memory 404 via bus 414.

The hardware device 400 may operate in a networked environment using logical connections to one or more remote nodes (not shown) via communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 412 may include logic configured to support direct memory access (DMA) transfers between memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of hardware device 400 illustrated in FIG. 4 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 400. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for transferring an asset from a parent chain to a sidechain, the method comprising:
   sending, by a processor, a parent chain asset to an output of the parent chain;
   generating, by the processor for the output, a simplified payment verification (SPV) proof associated with the parent chain asset, the SPV proof meeting a predetermined threshold level of computational work, the generating taking place over a predetermined period of time;
   validating, by a sidechain validator server, that the SPV proof associated with the parent chain asset meets the threshold level of computational work indicated by the SPV proof;
   generating a sidechain asset corresponding to the parent chain asset;
   holding the sidechain asset for a predetermined contest period;
   monitoring the parent chain asset during the predetermined contest period for any reorganization proofs associated with the parent chain asset;
   releasing the sidechain asset in response to a determination that no reorganization proof associated with the parent chain asset has been created during the predetermined contest period, the reorganization proof associated with the parent chain asset being a published proof that includes more aggregate work than the SPV proof associated with the parent chain and does not include a block recording the sending of the parent chain asset to the output of the parent chain;

sending, by a second processor, the sidechain asset to an output of the sidechain;

generating, by the second processor, a SPV proof associated with the sidechain asset;

validating, by a parent chain validator server, the SPV proof associated with the sidechain asset;

holding the parent chain asset for a second predetermined contest period;

monitoring the sidechain asset during the second predetermined contest period for any reorganization proofs associated with the sidechain chain asset; and releasing the parent chain asset in response to a determination that no reorganization proof associated with the sidechain asset has been created during the second predetermined contest period.

2. The method of claim 1, the validating the SPV proof associated with the sidechain asset comprising validating, by the parent validator server, that the SPV proof associated with the sidechain asset meets the threshold level of work indicated by the SPV proof associated with the sidechain asset, the method further comprising:

when release of the parent chain asset is denied, receiving a second SPV proof associated with the sidechain asset;

validating the second SPV proof associated with the sidechain asset;

holding the parent chain asset for a third predetermined contest period, during which a release of the parent chain asset is denied if a reorganization proof associated with the sidechain asset is detected in the sidechain; and releasing the parent chain asset if no reorganization proof associated with the sidechain asset is detected.

3. The method of claim 1, wherein the predetermined contest period has a duration that is a function of a relative hashpower of the parent chain and the sidechain.

4. The method of claim 1, wherein the sidechain asset differs from the parent asset in one of block structure and transaction chaining.

5. The method of claim 1, wherein the sidechain asset utilizes a ring signature scheme.

6. The method of claim 1, the sidechain asset further comprising script extensions not present in the parent chain asset.

7. The method of claim 1, wherein the sidechain supports demurrage for sidechain assets.

8. The method of claim 1, wherein the sidechain supports smart property.

9. A method for transferring an asset from a parent chain to a sidechain, the method comprising:

validating, by a sidechain validator server, a parent chain asset in response to receiving, by the sidechain validator server, a request to transfer the parent chain asset to the sidechain, the validating comprising determining if a proof of work associated with the parent chain asset is valid;

generating a sidechain asset corresponding to the parent chain asset in response to determining that the proof of work is valid;

sending the sidechain asset to an output of the sidechain in response to a request to transfer the sidechain asset back to the parent chain;

generating a simplified payment verification (SPV) proof associated with the sidechain asset;

validating, by the parent chain, the SPV proof associated with the sidechain;

holding the parent chain asset for a predetermined contest period;

monitoring the sidechain asset during the predetermined contest period for any reorganization proofs associated with the sidechain chain asset, the reorganization proof associated with the sidechain asset being a published proof that includes more aggregate work than the SPV proof associated with the sidechain and does not include a block recording the sending of the sidechain asset to an output of the sidechain; and releasing the parent chain asset in response to a determination that no reorganization proof associated with the sidechain asset has been created during the predetermined contest period.

10. The method of claim 9, the generating the sidechain asset further comprising sending the parent chain asset to a federated peg, the federated peg comprising a plurality of functionaries, wherein at least one functionary generates a SPV proof associated with the parent chain asset, the SPV proof comprising a threshold level of work, the generating taking place over a predetermined period of time, the method further comprising activating, by a server of the federated peg, the generated sidechain asset in response to receiving a nonce, a ScriptPubKey, and the generated SPV proof, the activating the sidechain asset allowing the sidechain asset to be transferred within the sidechain.

11. The method of claim 10, wherein the federated peg is not monitored by blockchains of the parent chain.

12. The method of claim 1, further comprising:

sending a second parent chain asset to a second output of the parent chain;

generating a SPV proof associated with the second parent chain asset;

validating, by the sidechain validator server, that the SPV proof associated with the second parent chain asset meets a threshold of work indicated by the SPV proof associated with the second parent chain;

generating a second sidechain asset corresponding to the second parent chain asset;

holding the second sidechain asset for the predetermined contest period; and invalidating the transfer of the second sidechain asset in response to a determination that a reorganization proof associated with the second parent chain asset has been created during the predetermined contest period.

13. The method of claim 9, further comprising:

validating a second parent chain asset;

generating a second sidechain asset corresponding to the second parent chain asset in response to validating the second parent chain asset;

sending the second sidechain asset to a second output of the sidechain in response to a request to transfer the second sidechain asset back to the parent chain;

generating a SPV proof associated with the second sidechain asset;

validating the SPV proof associated with the second sidechain asset;

holding the second parent chain asset for the predetermined contest period;

monitoring the second sidechain asset during the predetermined contest period for any reorganization proofs associated with the second sidechain asset; and denying release of the second parent chain asset in response to a determination that a reorganization proof associated with the second sidechain asset has been created during the predetermined contest period.

\* \* \* \* \*